A. C. SHELDON & E. B. POPE.
Lamp-Reflector.
No. 205,308. Patented June 25, 1878.
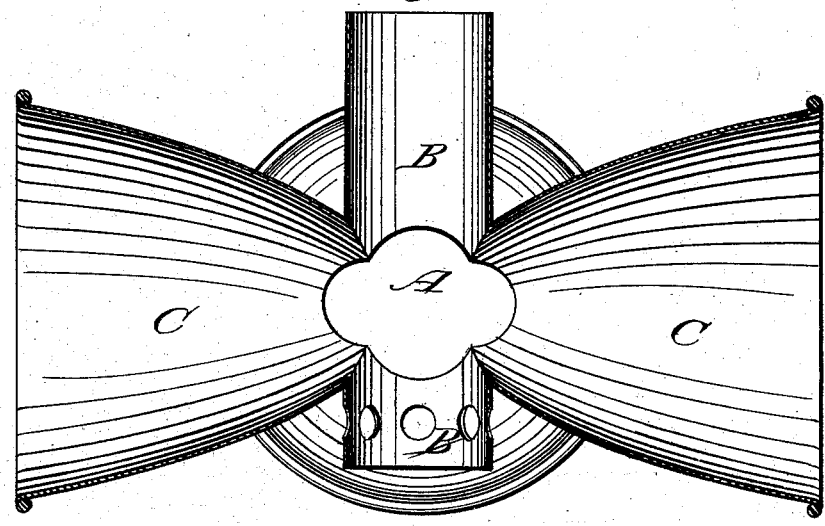
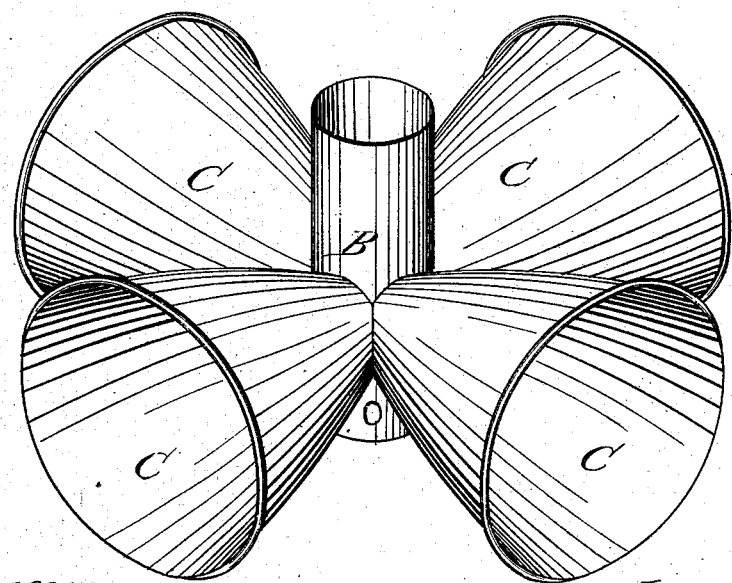

UNITED STATES PATENT OFFICE.

ALBERT C. SHELDON AND EDWIN B. POPE, OF ST. LOUIS, MISSOURI, ASSIGNORS OF ONE-HALF THEIR RIGHT TO EDWARD P. McCARTY AND E. M. POWERS.

IMPROVEMENT IN LAMP-REFLECTORS.

Specification forming part of Letters Patent No. 205,308, dated June 25, 1878; application filed May 31, 1878.

*To all whom it may concern:*

Be it known that we, ALBERT C. SHELDON and EDWIN B. POPE, of the city of St. Louis and State of Missouri, have invented a new and useful Improvement in Street or other Lamp Reflectors, of which the following is a clear, full, and exact description, reference being had to the accompanying drawings, making a part of this specification, in which—

Figure 2 is a perspective view of four (4) of our reflectors combined with a collar or chimney and ready for use. Fig. 1 is a sectional view of the same.

Our invention relates especially to lamps designed for lighting streets or for signal purposes, but is applicable to lamps for general illuminating purposes, as will be evident from our description of the same.

It consists in the combination of two or more intersecting parabolic reflectors, having the foci of the reflecting-surfaces in the circumference of the same flame, with an opaque collar or chimney. These reflectors are arranged around the flame, light, or illuminating object, with their small ends next the light, for the purpose of receiving the light from a common or single burner or light and throwing or diffusing it in different directions, as hereinafter explained and claimed, while the opaque collar confines the rays of light in some degree and casts them downward under the lamp.

To enable others skilled in the art to make and use our invention, we will proceed to describe the exact manner in which we have carried it out.

In the drawings, A represents the flame, burner, or jet, or the space for the same, and above and below the same, and connecting or connected with the reflectors, is secured the opaque collar or chimney B, with any desired ornamentation on the top or over the same.

Opposite the blaze of the flame or burner A we make any number of openings in the opaque collar or chimney to suit the number of reflectors to be attached thereto. These reflectors we make in the form of a parabola, so shaped as to have the foci of the reflecting-surfaces in the circumference of the flame, with the small ends toward the common flame and fitted to the openings of the collar B. We connect the outer sides or surfaces of the reflectors with each other, bringing their openings around or in front of the flame, as shown in Fig. 1, which receive the light from the burner and cause it to be thrown in as many directions as there may be reflectors.

The collar B is constructed of metal or other opaque material, operating both for the purpose of confining the rays of light and in a measure casting them downward to the apertures in the reflectors and immediately under the lamp, and also as a connection and support of the reflectors. Said combination, placed upon a street-lamp on a corner of two streets, can be utilized for lighting the streets the distance of a square or more in four directions, thus making one lamp or flame light four blocks where six lamps or more are usually employed.

Having thus explained our invention, what we claim as new, and desire to secure by Letters Patent, is—

In a street or other lamp, two or more reflectors, C, placed before and around the flame or light, as described, in combination with an opaque collar or chimney, B, substantially as and for the purpose set forth.

ALBERT C. SHELDON.
EDWIN B. POPE.

Witnesses:
ED. P. McCARTY,
E. M. POWERS.